Oct. 20, 1970   F. ARMBRUSTER   3,535,494
ELECTRIC HEATING MAT
Filed Oct. 4, 1967   4 Sheets-Sheet 1
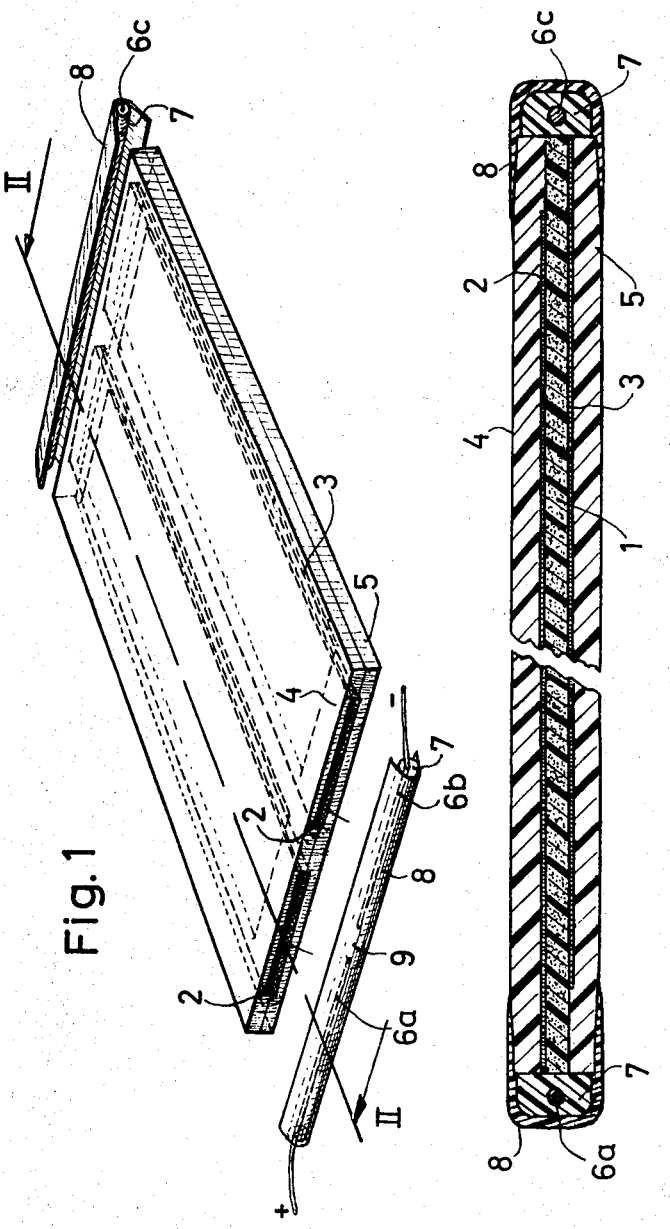
INVENTOR:
Fritz Armbruster
BY Michael S. Striker
Attorney Oct. 20, 1970  F. ARMBRUSTER  3,535,494

ELECTRIC HEATING MAT

Filed Oct. 4, 1967  4 Sheets-Sheet 2

INVENTOR:
Fritz Armbruster
BY Michael S. Striker,
Attorney

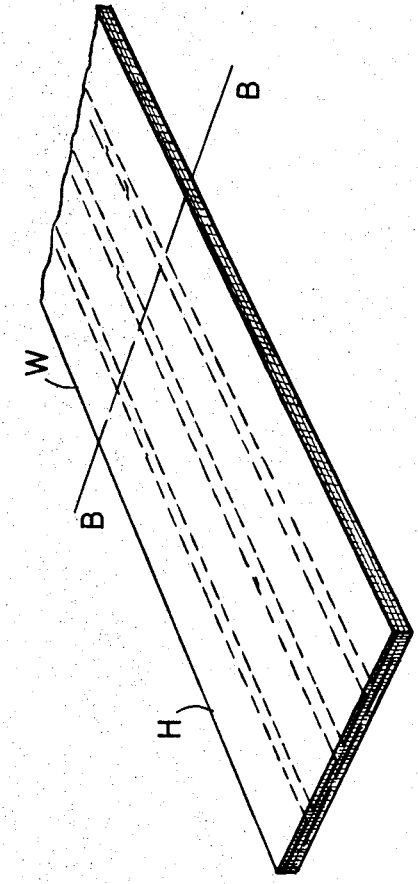
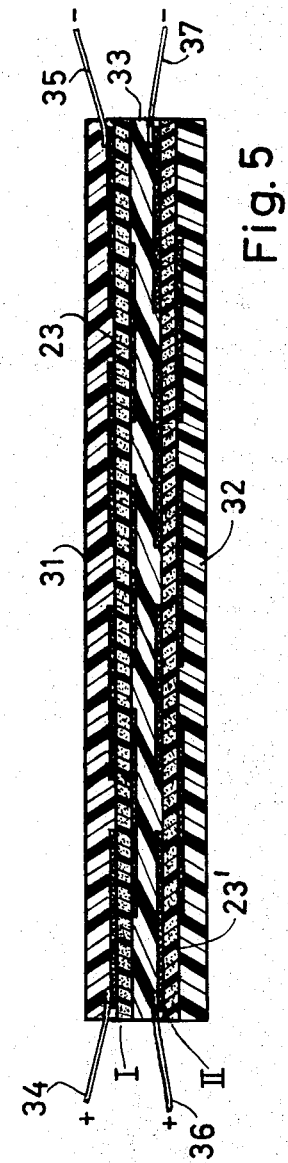

United States Patent Office 3,535,494
Patented Oct. 20, 1970

3,535,494
ELECTRIC HEATING MAT
Fritz Armbruster, Korntaler Str. 23,
Stuttgart-Stammheim, Germany
Filed Oct. 4, 1967, Ser. No. 673,568
Claims priority, application Germany, Nov. 22, 1966,
1,565,407
Int. Cl. H05b 3/34, 3/54
U.S. Cl. 219—528                        4 Claims

ABSTRACT OF THE DISCLOSURE

An electric heating mat for operation with low voltage in which thin metal foils are applied to opposite faces of flexible sheet means of electrically conductive material of high electrical resistance and connected in circuit with a low voltage supply of electrical energy in such a manner that current will pass in direction substantially normal to said opposite faces through the sheet means, and in which the sheet means and the metal foils applied thereto are sandwiched between a pair of plastic sheets to form with the latter a flexible heating mat; and a method for producing the mat.

BACKGROUND OF THE INVENTION

In the art of heating, and especially room heating, it has long been recognized that a much better and substantially draft-free heat distribution in a room may be obtained when the heat is not produced in individual stoves or individual radiators connected to a central heating system, but when the heat is produced in panels or mats applied to the walls, the ceiling, or preferably, to the floor of the room to be heated.

Many heating systems of the latter type in which the walls or the floor of the room are directly heated have been developed lately, for instance tubes through which a heating fluid is passed have been laid in meander-form in the walls or the floor of the room or insulated resistor wires through which electrical current is passed have been embedded in meander-form in the walls or the floor of a room. These floor or wall heating arrangements known in the art are however rather expensive to manufacture and to maintain and replacement thereof is extremely difficult and likewise extremely expensive. Due to these facts the aforementioned heating systems, while desirable in many respects, have only found very limited application.

It is an object of the present invention to provide for electrical heating means suitable especially for application to walls or the floor of a room to heat the latter and which avoid the disadvantages of such heating means known in the art.

It is an additional object of the present invention to provie for an electrical heating mat especialy suitable for application to the walls or the floor of a room for heating the same and which can be manufactured in an expedient manner and at very reasonable cost.

It is a further object of the present invention to provide for such an electrical heating mat which can be operated at low voltage to reduce the danger of contact with any current carrying part of the mat.

It is also an object of the present invention to provide for a method of producing the electrical heating mat in an efficient manner.

SUMMARY OF THE INVENTION

With these objects in view, the electrical heating mat according to the present invention adapted to be operated with low voltage mainly comprises flexible sheet means of electrically conductive material of high resistance, thin metal foil means applied to opposite faces of the flexible sheet means and arranged in such a manner and connected in circuit to a low voltage supply of electrical energy so that current will flow through the whole sheet means in direction substantially normal to the aforementioned opposite faces thereof, and non-conductive plastic material embedding the sheet means and the metal foil means to form an insulated heating mat.

The electrically conductive flexible sheet means preferably comprises a layer of plastic material and small particles of electrically conductive material substantially uniformly distributed throughout the layer of plastic material. The small particles of electrically conductive material are preferably in the form of colloids, that is particles having a diameter of less than 0.5 micron. A plastic sheet with the small particles of electrically conductive material substantially uniformly distributed therein has a uniform electrical conductivity in all directions and the strength as well as the elasticity of the sheet is not reduced by the electrically conductive particles distributed therein.

Since electrically conductive flexible sheet means of the aforementioned kind have an electrical resistance which is 100 to 1000 times higher than that of metallic conductors, the flexible sheet means of electrically conductive material could not be used in an arrangement in which the current has to pass in longitudinal direction through the sheet means, and especially such electrical conductive sheet means could not be used in a heating mat to be operated at low voltage without the special arrangement according to the present invention in which the thin metal foils are applied to opposite faces of the aforementioned electrically conductive flexible sheet means arranged in such a manner that current will flow through the sheet means substantially normal to the opposite faces thereof. Since the flexible sheet means have usually a small thickness, in the order of less than 1 mm., they constitute in the arrangement according to the present invention a conductor of very short length and very great cross section so that even if low voltage, i.e., 20–30 v., is applied to the heating mat enough current to produce the necesary heat will pass therethrough.

The metal foils may be formed from copper, aluminum, or any other metal of high electrical conductivity and be applied under pressure to opposite faces of the aforementioned flexible sheet means of electrically conductive material of high resistance, or the metal foils may be applied by vapor deposition to the opposite faces. The foils have preferably a thickness of 10 to 25 microns.

The method of producing electrical heating mats according to the present invention mainly comprises the steps of forming an elongated electrical conductive flexible sheet of high resistance composed of plastic material with small particles of electrically conductive materially substantially uniformly distributed therein, applying longitudinally extending metal foil strips to the sheet, extruding a pair of elongated plastic sheets and simultaneously feeding the elongated electrically conductive sheet with the metal foil strips applied thereto between the pair of extruded plastic sheets, uniting the aforementioned sheets under application of pressure to a composite web, and cutting the composite web transversely to heating mats of desired lengths.

BRIEF DESCRIPTION OF THE DRAWING

FIG. 1 is a perspective view illustrating a heating mat according to the present invention and conductors for supplying the heating mat with electrical energy, which conductors are shown in FIG. 1 before the application to the heating mat;

FIG. 2 is a longitudinal cross section taken along the line II—II of FIG. 1 drawn to an enlarged scale and in FIG. 2 the conductors are shown applied to opposite end edges of the heating mat;

FIG. 5 is a transverse cross section through a fourth embodiment of a heating mat according to the present invention;

FIG. 6 is a partial perspective view illustrating how heating mats of predetermined length may be cut from an elongated composite web produced according to the present invention;

DESCRIPTION OF THE PREFERRED EMBODIMENTS

Figure 3:
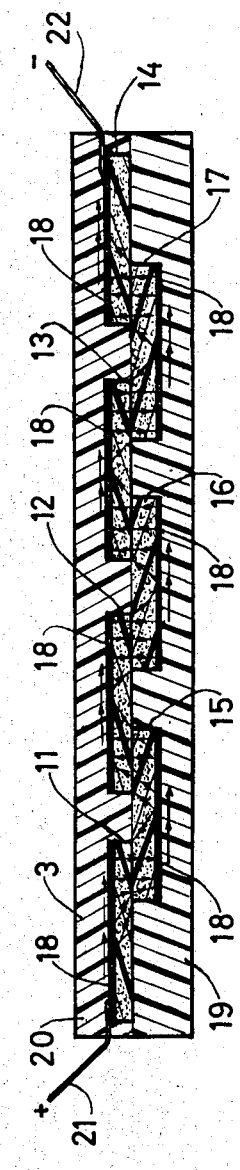
FIG. 3 is a transverse cross section through another embodiment of a heating mat according to the present invention.

Referring now to the drawings, and more specifically to FIGS. 1 and 2 of the same in which one embodiment of the heating mat H according to the present invention is illustrated, it will be seen that this embodiment mainly comprises a pair of elongated flexible sheets 1 of electrically conductive material of high resistance, each composed of a layer of plastic material and small particles of electrically conductive material substantially uniformly distributed throughout the layer of plastic material, and in which the two sheets 1 are arranged substantially in a plane transversely spaced from each other. Thin metal foils 2 and 3 are respectively applied to opposite faces of each flexible sheet 1 in such a manner, as best shown in FIG. 2, that the upper foil 2 extends from one end, that is the left end as viewed in FIG. 2, of the sheet 1 toward but short of the right end thereof, whereas the lower foil 3 extends from the right end, as viewed in FIG. 2, towards but short of the left end of the sheet 1. The side by side arranged sheets 1 and the metal foils applied to opposite faces thereof are embedded in a pair of sheets 4 and 5 of plastic non-conductive material with the end edges of the sheets 1 and the corresponding end edges of the metal foils applied thereto not covered.

The conductor means for supplying electrical current to the metal foils 2 and 3 applied to the sheets 1 may comprise a pair of conductors or metal wires 6a and 6b extending substantially parallel to one transverse end edge, for instance the left end edge, as viewed in FIG. 2, of the sheets 1 with the inner ends of the wires 6a and 6b spaced from and insulated from each other by a plug of plastic material 9 as indicated in FIG. 1, whereas the outer ends of the wires 6a and 6b are adapted to be connected to opposite poles of a low voltage current supply. The conductors 6a and 6b are embedded along the edge of the mat in sleeves 7 of conductive material of the kind from which the sheets 1 are formed so that current may flow from the respective conductor through the sleeve 7 and from there to the metal foils 2 applied to the sheets 1. The conductive sleeves 7 are in turn enveloped by an outer U-shaped layer 8 of non-conductive plastic material, the lateral edge portions of which extend over edge portions of the outer plastic sheets 4 and 5 are connected thereto by heat sealing. A wire 6c extends along the right edge, as viewed in FIG. 2, of the sheets 1 and this wire extends uninterrupted between the pair of sheets and along the transverse end edges thereof. The wire 6c is likewise enveloped in a sleeve 7 of electrically conductive material so that an electric connection is established between the wire 6c and the pair of lower foils 3 applied to the pair of sheets, and the sleeve 7 is again enveloped in a U-shaped enclosure 8 heat sealed at edge portions which overlap the outer plastic sheets 4 and 5 to the latter.

In this arrangement current will flow from the wire 6a to the upper foil 2 applied to the left conductive sheet 1, as viewed in FIG. 1, and from the upper foil 2 in direction substantially normal thereto through the thickness of the respective conductive sheet 1 to the foil 3 applied to the lower face thereof and from there to the conductor 6c through which the current will flow to the lower foil 3 applied to the right sheet 1, as viewed in FIG. 1, and from the lower foil in direction substantially normal thereto to the upper foil 2 applied to the right sheet 1 and from the end edge of the upper foil 2 to the conductor 6b and back to the current supply. In other words, in this arrangement current will flow through the sheets 1 in direction substantially normal to the main faces thereof and substantially through the whole area of the sheet. The foils 2 and 3 serve not only to distribute the current over the whole area of each sheet 1, but the foils will also insure uniform distribution of the heat produced by the electrical energy passing through the mat.

FIG. 3 illustrates a second embodiment of a heating mat according to the present invention in transverse cross section. As can be seen from FIG. 3, the heating mat illustrated therein comprises a first plurality of elongated strips 11, 12, 13 and 14 arranged substantially in one plane transversely spaced from each other and extending in longitudinal direction longitudinally of the heating mat and being formed from the same material as the sheets 1 in the embodiment illustrated in FIGS. 1 and 2. A second plurality of strips 15, 16 and 17 formed from the same material are arranged likewise transversely spaced from each other in a plane beneath the first plurality of strips and offset with respect thereto so that longitudinal edge portions of the second plurality of strips are overlapped and in abutting engagement with corresponding edge portions of the first plurality of strips. Thin metal foils 18 are applied to the main faces of the first and the second plurality of strips which face away from each other and the outermost foils 18 are respectively connected by conductors 21 and 22 to opposite poles of a low voltage current supply. The first and the second plurality of strips and the foils applied to the faces thereof are again embedded in a pair of sheets 19 and 20 of plastic non-conductive material which likewise fill the spaces between transversely spaced strips of the first and the second plurality of strips. When a current is supplied to the conductors 21 and 22 current will flow through the foils and the plurality of strips as indicated by the arrows, in other words, current will flow through the strips 11–17 substantially normal to the main faces thereof. The connection between the conductors 21 and 22 to the foils 18 applied to the strips 11 and 14 is only schematically shown in FIG. 3 and these conductors may be connected to the foils in a similar manner as described and illustrated in FIGS. 1 and 2.

Figure 4:
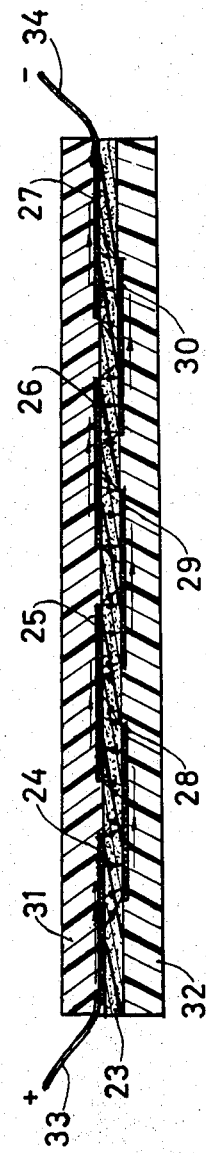
FIG. 4 is a transverse cross section through a third embodiment of a heating mat according to the present invention.

FIG. 4 illustrates a third embodiment of the heating mat according to the present invention in transverse cross section. As shown in FIG. 4 the heating mat of this embodiment comprises an elongated sheet 23 formed from the same material as sheets 1 of the embodiment illustrated in FIGS. 1 and 2 which extends longitudinally through the whole length of the heating mat and transversely substantially through the whole width thereof. A first plurality of thin metal foils 24, 25, 26 and 27 are applied transversely spaced from each other to the upper face of the sheet 23 and extending longitudinally through the whole length of the mat, and a second plurality of thin metal foils 28, 29 and 30 likewise transversely spaced from each other are applied to the bottom face of the sheet 23 in such a manner that opposite longitudinal edge portions of the second plurality of foils are overlapped by corresponding edge portions of the first plurality of foils as clearly shown in FIG. 4. Conductors 33 and 34 are connected to the foils 24 and 27 so that when current is supplied to these conductors, current will flow through the foils and through the sheet 23 as indicated by the arrows, in other words current will flow in direction substantially normal to the plane of the foils through the thickness of the sheet 23. The sheet 23 and the foils applied to the opposite faces thereof are again embedded in a pair of sheets 31 and 32 of plastic electrically non-conductive material which likewise fill the spaces between adjacent foils. The conductors 33 and 34 may be again connected to the respective foils in the manner as explained in connection with FIGS. 1 and 2.

FIG. 5 illustrates a fourth embodiment of a heating mat according to the present invention in cross-section, which is very similar to the heating mat construction shown in FIG. 4 and differs therefrom in that two sheets 23 and 23' with foils applied to opposite faces thereof as described in connection with FIG. 4 are arranged superimposed upon each other and separated by a plastic sheet of non-conductive material 3. Conductors 34 and 35 are connected to the outermost foils applied to the sheet 23 and separate conductors 36 and 37 are connected through the outermost foils of the sheet 23'. The pair of conductors 34 and 35 as well as the pair of conductors 36 and 37 are adapted to be connected by means not shown in the drawing selectively to a current supply so that current may be passed either only through the sheet 23 or only through the sheet 23' or through both of the sheets so as to increase in the latter case the heat produced by the heating mat.

Figure 7:
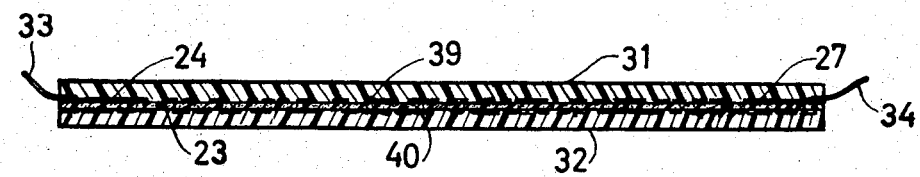
FIG. 7 is a transverse cross section through a fifth embodiment of a heating mat according to the present invention.

FIG. 7 is a transverse cross-section through another embodiment of a heating mat according to the present invention which is very similar to the heating mat illustrated in FIG. 4. The heating mat shown in FIG. 7 comprises as the embodiment shown in FIG. 4 a central electrically conductive flexible sheet 23 and a pair of elongated metal coils strips 24 and 27 applied to one face of this sheet along marginal longitudinal portions thereof. The other metal foil strips 25, 26, 28–30 of the embodiment shown in FIG. 4, are however replaced by layers of randomly distributed thin metal flakes 39 and 40 applied to opposite faces of the sheet 23 and such flakes may also be distributed in addition to the small electrically conductive particles throughout the layer 23. The layers or flakes 39 and 40 applied to opposite faces of the sheet 23 will have the same function as the spaced metal foils arranged to opposite faces of the layer 23 of the embodiment shown in FIG. 4. In the embodiment shown in FIG. 7 current will pass, when the conductors 33 and 34 connected to the metal foil strips 24 and 27 are in circuit with a current supply, again substantially in direction normal to the main faces through the sheet 23.

It is mentioned that especially FIGS. 3, 4, 5 and 7 are not drawn to any scale, but for clarity sake the vertical dimensions are considerably increased and the horizontal dimensions considerably reduced.

The heating mats shown in the embodiments illustrated in FIGS. 3, 4, 5 and 7 may be manufactured in the form of endless webs W as shown in FIG. 6 which is then cut transverse to its elongation as indicated by the dash-dot line B—B in heating mats H of desired length.

Figure 8:
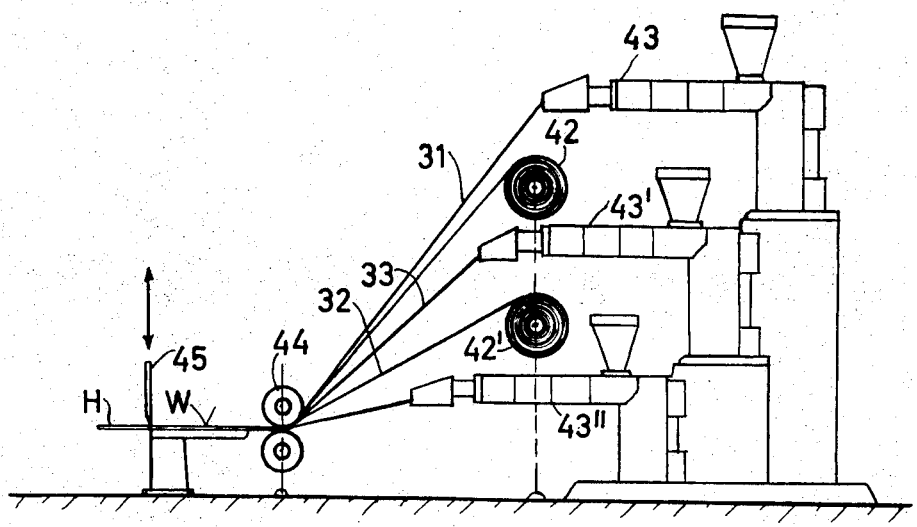
FIG. 8 is a schematic side view of an apparatus for producing heating mats according to the present invention.

FIG. 8 schematically illustrates an apparatus for producing heating mats according to the present invention in a continuous process. The apparatus is especially adapted for producing a heating mat as illustrated in FIG. 5. First elongated strips of plastic material with small particles of electrically conductive material substantially uniformly distributed throughout the plastic material are produced and to opposite faces thereof metal foils as shown in FIG. 4 are applied and spools 41 and 42 of the thus combined strips of electrically conductive flexible sheets with metal foils applied thereto are arranged between extrusion heads of extruding machines 43, 43', and 43'', as schematically shown in FIG 8, through which strips of plastic material corresponding to the strips 31, 37 and 32 shown in FIG. 5 are extruded, while the strips from the spools 42 and 42' are fed between the extruded plastic strips. All of the strips are fed between oppositely rotating feed and pressure rollers 44 which combine the strips under application of pressure into a composite web. The composite web is then fed through a cutting apparatus 45 having a reciprocating cutter which cuts the endless web W into heating mats H of desired lengths. Finally outside conductors are applied to the marginal foils of the heating mat and the latter are then ready for shipment to the customer.

It is evident that the machine schematically illustrated in FIG. 8 can also be easily adapted to manufacture heating mats as shown in FIGS. 1, 3, 4 and 7. In manufacturing heating mats as shown in FIG. 1, care has to be taken that the web is cut by the cutting apparatus 45 in accordance with the length of the metal foils applied to the sheet of electrically conductive material 1. In order to produce heating mats as shown in FIGS. 3, 4, 5 and 7, the webs can be cut to any desired length since the metal foils in these embodiments extend longitudinally through the whole length of the mat. The flexible sheets of electrically conductive material which comprise a layer of plastic material with small particles of electrically conductive material substantially uniformly distributed throughout the layer of plastic material may also be formed by extrusion and the metal foils may then be applied to one or opposite faces of these sheets in any convenient manner.

The electrical resistance of the mats is preferably calculated to produce when energized a temperature of 25–30° C. The plastic material used is preferably polyvinyl chloride. If higher temperatures are desired other plastic materials, such as for instance poly ethylene, may also be used.

It will be understood that each of the elements described above, or two or more together, may also find a useful application in other types of electrical heating mats differing from the types described above.

While the invention has been illustrated and described as embodied in an electrical heating mat, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An electrical heating mat comprising, in combination, a first plurality of flexible strips of electrically conductive material of high electrical resistance extending transversely spaced from each other in longitudinal direction of said mat; a second plurality of such strips extending transversely spaced from each other in said direction and being offset with respect to said first plurality of flexible strips in such a manner that lateral portions of said second plurality of strips overlap and are located opposite corresponding lateral portions of said first plurality of strips; a first and a second plurality of metal foil strips respectively applied to and extending over the faces of said first and second plurality of said flexible strips which face away from each other; conductor means connecting opposite poles of a current supply to transversely outermost metal foil strips of said mat so that current will flow between overlapping portions of adjacent metal foil strips on said faces of said flexible strips through the latter from one to the other of said outermost metal foil strips; and flexible insulating material embedding said flexible strips and said metal foil strips applied thereto to form a flexible mat.

2. An electrical heating mat as defined in claim 1, wherein said flexible sheet means comprises a layer of plastic material and small particles of electrical conductive material substantially uniformly distributed throughout the layer of plastic material.

3. An electrical heating mat as defined in claim 2, wherein said small particles of electrically conductive material are in the form of colloids.

4. An electrical heating mat as defined in claim 3, wherein said small particles of electrically conductive tially uniformly distributed in said layer of plastic material.

References Cited

UNITED STATES PATENTS

| 2,559,077 | 7/1951 | Johnson et al. | 219—543 |
| 2,715,668 | 8/1955 | Booker et al. | 219—543 X |
| 3,033,970 | 5/1962 | Eisler | 338—212 X |
| 3,277,419 | 10/1966 | Butz | 338—314 |
| 3,287,684 | 11/1966 | Armbruster | 219—543 X |
| 3,385,959 | 5/1968 | Amer et al. | 219—549 |
| 2,340,097 | 1/1944 | Woodman | 219—529 |
| 2,688,070 | 8/1954 | Freedlander | 219—528 |
| 3,221,145 | 11/1955 | Hager | 219—549 |
| 3,281,579 | 10/1966 | Glicksman | 219—535 |
| 3,397,302 | 8/1968 | Hosford | 219—528 |

FOREIGN PATENTS

| 1,230,097 | 3/1960 | France. |

VOLODYMYR Y. MAYEWSKY, Primary Examiner

U.S. Cl. X.R.

219—543, 549; 338—212